United States Patent Office 3,411,068
Patented Nov. 12, 1968

3,411,068
BRUSHLESS ALTERNATORS OF THE SELF-REGULATING AND SELF-EXCITING TYPE
Ernst Wolfgang Krebs, Purley, England, assignor to Selectra Limited, Purley, England, a British company
Claims priority, application Great Britain, Dec. 31, 1964, 53,102/64
9 Claims. (Cl. 322—25)

ABSTRACT OF THE DISCLOSURE

The invention provides a brushless alternator of the type having a rotating field winding excited from a separate rotary frequency changer exciter including a rotating armature mounted on the shaft of the alternator to rotate with the main field winding to which it is permanently connected via a field rectifier also mounted on the same shaft. A single exciter stator primary winding is supplied through a primarily nonresistive constant impedance with a component of excitation current which is dependent on and derived from the output voltage of the alternator, and also is supplied with a component of excitation current which is dependent on the load current of the alternator and is obtained therefrom by a current transformer. The constant impedance is independent of current variations at a given frequency, and may either comprise a capacitor, or a linear auto-transformer having an air gap in its core whereby the auto-transformer also acts as the current transformer, being connected in series with the exciter primary winding across the output terminals of the alternator and having a tapped portion of its winding connected in series with the stator winding of the alternator to carry the load current thereof.

---

Figure 1:
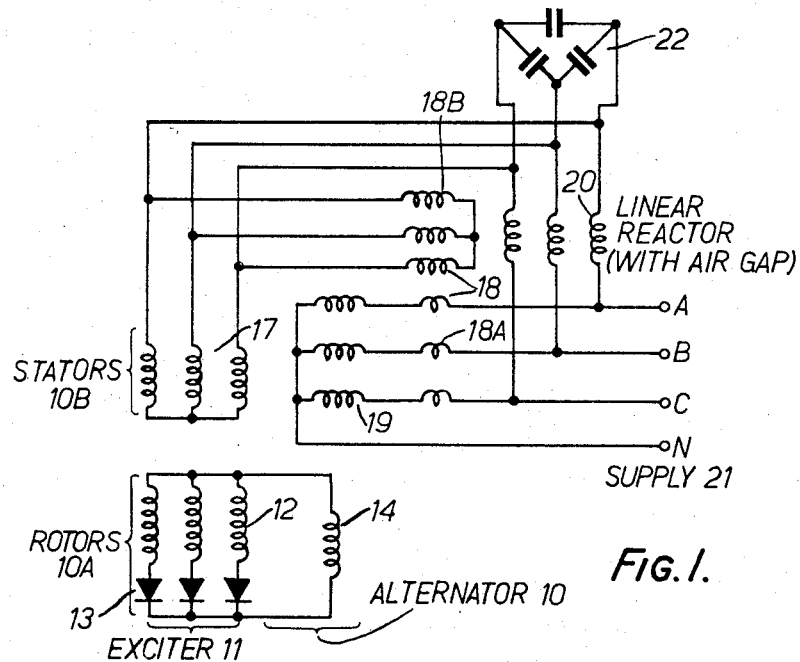

This invention relates to self-excited and self-regulating alternators of the brushless type, having a rotating field which is excited by an alternating-current exciter whose rotating armature is mounted to rotate with the rotating field winding of the alternator, and is permanently connected to the field winding of the alternator via a field rectifier which is also mounted to rotate with the said field winding. Such machines are referred to herein as brushless alternators.

The main objects of the invention are to simplify the construction and to increase the reliability of this type of synchronous alternator, and to obtain a close voltage regulation at all loads and power factors combined with a rapid voltage recovery after sudden changes of load.

The invention is an improvement in or modification of that forming the subject of the present applicant's United States of America patent application No. 366,006, now abandoned, which describes a brushless synchronous machine of the type specified whose exciter is arranged as a rotary frequency-changer having a single rotary secondary winding connected to the field winding of the main machine via a rotating rectifier, and having a stator with two separate primary windings, both primary windings being of the same number of phases and having the same number of poles and both being fed from the output of the main machine, one by an alternating-current component dependent on the load current of the main machine and the other by an alternating-current component dependent on the terminal voltage of the main machine.

In the embodiment of FIGURE 5 of the aforesaid application No. 366,006, a current transformer is incorporated, the primary winding of the current transformer being excited by the alternator load current and the secondary winding of the current transformer, which has a larger number of turns than its primary winding, being connected to the exciter primary winding which carries the component dependent on terminal voltage. The effect of this is to transfer a proportion of the excitation duty from the exciter primary winding carrying the load current component, to the other primary winding of the exciter into which it is injected, thereby enabling the number of turns of the primary winding for the current-dependent component to be correspondingly reduced.

According to the present invention a brushless alternator has its exciter arranged as a rotary frequency-changer having a single rotary secondary winding connected through the field rectifier to the field winding of the alternator and having a single stator primary winding fed from the output of the alternator, the said exciter primary winding being fed via a primarily non-resistive constant impedance (as defined below) with a component of excitation current which is dependent on and is obtained from the output voltage of the alternator, and being also fed with a component of excitation current which is dependent on the load current of the alternator and is obtained therefrom by a current transformer.

In this connection the term "constant impedance" is intended to mean an impedance which is independent of current variations at a fixed frequency, and not one that is independent of frequency variations.

The constant impedance may be substantially wholly inductive. For example it may comprise a linear reactor (an unsaturated choke) having an air gap in its magnetic circuit and connected to the exciter primary winding in parallel with the current transformer secondary winding. In this case a compensating capacitor may be connected in parallel across the exciter primary winding, the capacitance of the capacitor being approximately matched with the reactance of the linear reactor at the normal output frequency of the alternator. This measure virtually eliminates the reactive loading of the alternator by the excitation circuit, and in addition it ensures self-excitation of the alternator when starting and reduces the effect of variations in the resistance of the field winding.

The exciter and its associated rectifier are preferably three-phase, but the constant impedance should have the same number of phases as the alternator. If the alternator is single-phase, the exciter primary winding is preferably so arranged as to provide effective quadrature damping. This may be done either by providing an auxiliary short-circuited winding whose axis is at right angles to the exciter primary winding, or by joining two legs of the three-phase exciter primary winding, which should be star connected, and feeding the winding through this joint and the third leg of the winding.

The number of poles of the exciter may differ from that of the alternator. For polyphase machines it is preferable to make the frequency of the exciter output higher than that of its input, by arranging for the magnetic field in the air gap of the exciter to rotate in the direction opposite to that of the rotor shaft, so as to reduce the effect of the temperature variations in the resistance of the field winding of the alternator. The air gap of the exciter should be made as small as is practicable on account of mechanical limitations, since this reduces the magnetising current required and results in lower losses and faster voltage recovery after sudden load changes.

In one arrangement of the invention the excitation circuit includes a linear auto-transformer having an air gap in its magnetic circuit, the auto-transformer constituting both the constant impedance and the current transformer, and the whole of the winding of the or each phase of the auto-transformer being connected in series with the exciter primary winding across the output terminals of the alternator, and a tapped portion of the auto-transformer winding being connected in series with the stator winding of the alternator to carry the load current of the alternator.

In yet another form of the invention the constant impedance is a capacitor, preferably one whose capacitance is approximately matched with the reactance of the associated exciter primary winding at the normal output frequency of the alternator.

Permanent magnet means may be used for initiating the self-excitation of the alternator, instead of a capacitor arrangement as referred to. Thus a permanent magnet may be associated with the alternator or with the exciter, or there may be a separate, small permanent-magnet exciter provided with its own rectifier connected to the field circuit, for instance as described in British Patent No. 929,120.

Figure 2:
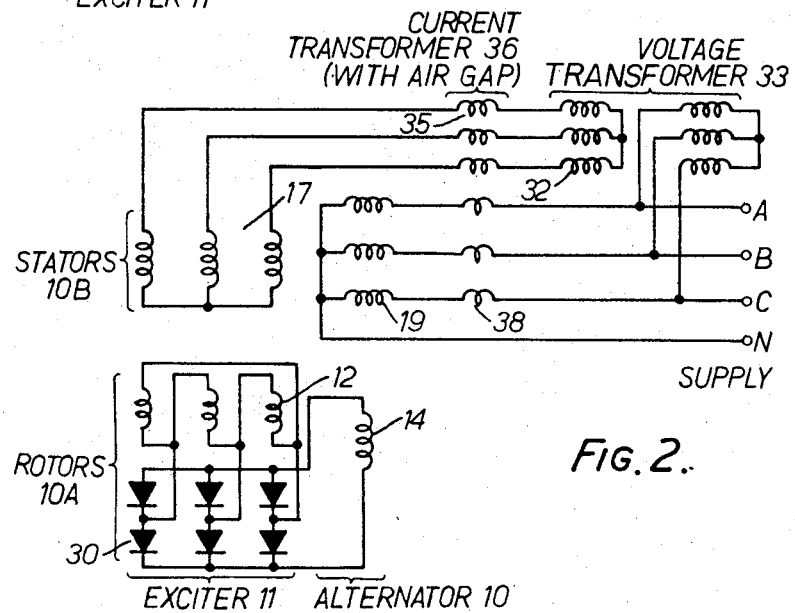
Figure 3:
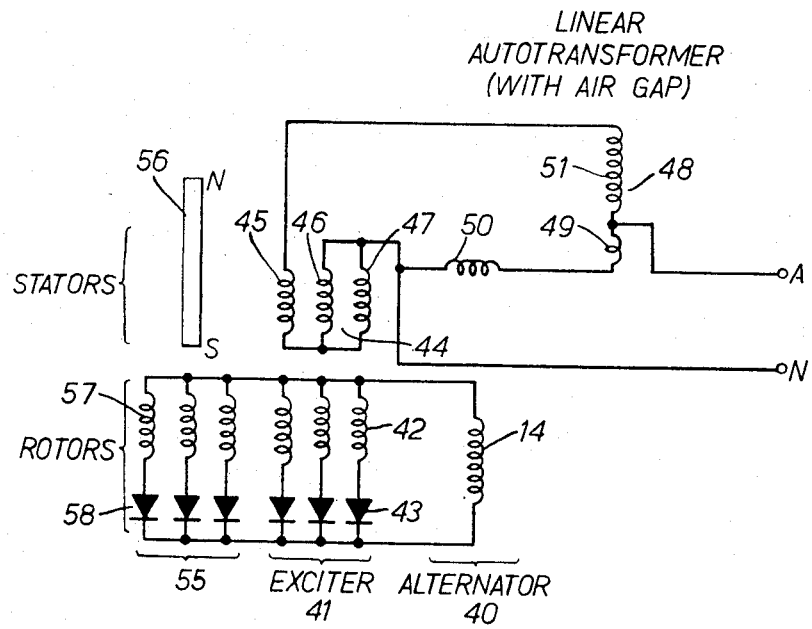
Figure 4:
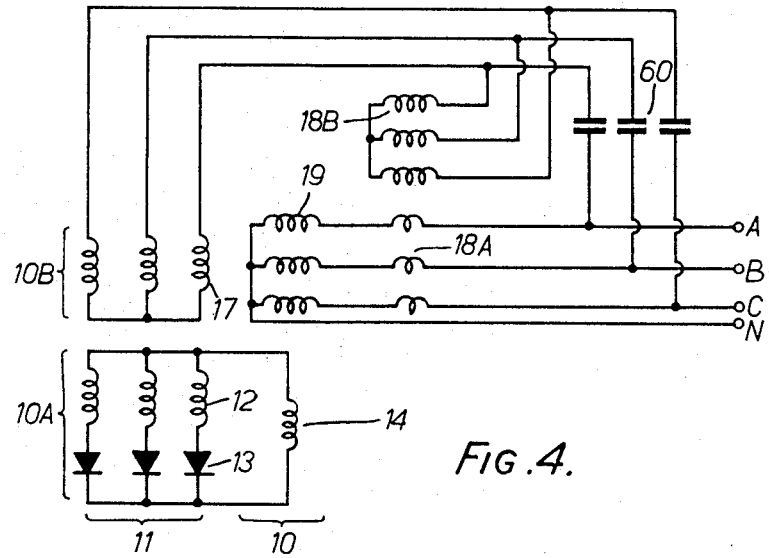

The invention may be carried into practice in various ways, but four specific embodiments will now be described by way of example only with reference to the accompanying drawings, in which:

FIGURE 1 is a circuit diagram of a self-exciting alternator of the brushless type incorporating in its excitation circuit a current transformer and a linear reactor with an air gap, FIGURE 2 is a circuit diagram of a modified form of brushless alternator, incorporating a current transformer with air gap and a voltage transformer in its excitation circuit, FIGURE 3 is a circuit diagram of another embodiment of brushless alternator incorporating in its excitation circuit a linear auto-transformer with air gap, and also incorporating an auxiliary permanent-magnet exciter in addition to its main exciter, and FIGURE 4 is a circuit diagram of a modification of the alternator of FIGURE 1 in which the constant impedance in the excitation circuit is a capacitor.

In the embodiment of FIGURE 1 the alternator 10 is a three-phase machine having an A.C. output winding 19 in its stator 10B, and a field winding 14 in its rotor 10A. The exciter 11 is in the form of a frequency changer whose single three-phase primary winding 17 is in the stator 10B and whose single three-phase secondary winding 12 is mounted on the same shaft as the rotor 10A of the alternator for rotation therewith and supplies the field winding 14 of the alternator through a three-phase rectifier 13.

The single primary winding 17 of the stator of the exciter 11 is connected to the secondary output winding 18B of a current transformer 18, and also to the output terminals A, B and C of the alternator 10 via a three-phase linear reactor 20 (an inductor in the form of an unsaturated choke) provided with an air gap in its core. The primary winding of the current transformer 18 is connected in series with the stator winding 19 of the alternator 10, and the current transformer 18 feeds an A.C. current component into the winding 17, which component is proportional to the load current of the alternator 10. The linear reactor 20 constitutes a constant impedance as defined above, and feeds an A.C. current component into the exciter primary winding 17, which component is substantially proportional to the terminal voltage of the alternator 10.

A three-phase compensating capacitor 22 is connected across the output terminals of the linear reactor 20, and its capacitance is approximately matched with the reactance of the reactor 20 at the supply frequency. The capacitor 22 serves the purposes of compensating for the reactive power consumption of the linear reactor 20 and of ensuring that the brushless alternator will safely self-excite under all conditions. Furthermore the tuned circuit afforded by the reactor 20 and the capacitor 22 improves the voltage regulation of the machine despite variations of resistance in the field winding 14 caused by temperature variations.

It will be noted that the embodiment of FIGURE 1 is a special case of the circuit arrangement of FIGURE 5 of the aforesaid application No. 366,006 in which the exciter had two separate primary windings. In the present case the whole of the current component is transferred and injected into the single primary winding 17 of the exciter, making redundant the second primary winding which is provided in application No. 366,006.

In the embodiment of FIGURE 2, the alternator 10 is again a three-phase machine provided with a three-phase frequency changer 11 as exciter. In this case however the rectifier 30 of the exciter is bridge-connected and the rotary winding 31 of the exciter is in delta. The input into the single primary winding 17 of the exciter 11 is provided by a series connection of the secondary winding 32 of a voltage transformer 33, with the secondary winding 35 of a current transformer 36 which is provided with an air gap in its core and whose secondary winding 35 constitutes the constant impedance. The primary winding 37 of the voltage transformer 33 is connected across the output terminals A, B and C of the stator winding 19 of the alternator 10, whilst the primary winding 38 of the current transformer 36 is connected in series with the output of the stator winding 19 of the alternator in the manner described in British patent specification No. 719,212 for alternators which are not of the brushless type. The air gap in the magnetic circuit of the current transformer 36 serves to limit the reactive voltage drop in this circuit and to obtain a close voltage regulation at all loads and power factors. The voltage recovery after sudden load changes in the arrangement of FIGURE 2 is not quite as good as in the example of FIGURE 1, on account of the series connection of the windings 32 and 35 feeding the primary winding 17 of the exciter.

In the embodiment of FIGURE 3 a single-phase alternator 40 is combined with a frequency-changer exciter 41 which is wound three-phase in stator and rotor. The rotary three-phase secondary winding 42 of the exciter feeds the field winding 14 of the alternator via a three-phase rectifier 43, as in FIGURE 1. The single three-phase stator primary winding 44 of the exciter 41 is connected with one leg 45 in series with a parallel combination of the other two legs 46 and 47, to obtain effective quadrature damping. The stator primary winding 44 of the exciter 41 is fed from a single-phase linear auto-transformer 48 having an air gap in its magnetic circuit, which replaces the combination of the linear reactor 20 and the current transformer 18 of the embodiment of FIGURE 1. The portion 49 of the winding of the auto-transformer 48 which contains the fewer turns is connected in series with the stator winding 50 of the alternator 40 so as to be excited by the load current of the alternator 40, whilst the current feeding the stator primary winding 44 of the exciter flows through the both parts 49 and 51 of the auto-transformer 48 and hence through the whole number of turns of the auto-transformer. The air gap in the magnetic circuit of the auto-transformer 48 serves the same purpose as in the embodiments of FIGURES 1 and 2.

The response time for voltage recovery in the embodiment of FIGURE 3 is similar to that of the embodiment of FIGURE 2. To obtain self-excitation under all conditions, a small permanent-magnet starting exciter 55 is provided, somewhat similar to that described in British Patent No. 929,120. The permanent-magnet starting exciter 55 has a permanent magnet stator 56 and a rotor winding 57 having its own rectifier 58 mounted on the same shaft as the rotor winding 42 of the exciter 41 and the field winding 14 of the alternator 40.

FIGURE 4 shows a modification of the alternator described with reference to FIGURE 1. In this case, in place of the linear reactor 20 of FIGURE 1, with its compensating capacitor 22, a constant impedance in the form of a capacitor 60 is connected in series with the exciter primary winding 17 across the output terminals A, B and C of the main alternator 10. The capacitance of the capacitor 60 is approximately matched with the reactance of the exciter primary winding 17. Moreover the connections of the secondary winding 18B across the exciter primary winding 17 are reversed with respect to those of the capacitor 60, in order to allow for the 180° phase shift due to the capacitor 60.

In other respects the arrangement of FIGURE 4 is similar to that of FIGURE 1, and similar parts are given the same reference numerals as in FIGURE 1. The embodiment of FIGURE 4 is commercially attractive in that the cost of the linear reactor 20 of FIGURE 1 is dispersed with, the size and cost of the capacitor 60 being of the same order as those of the compensating capacitor 22 of FIGURE 1.

In all the specific embodiments described and illustrated above it is possible to obtain a voltage regulation of 2 to 4% of the nominal value at all loads. If a closer regulation is required, a voltage-sensitive fine control may be superimposed on the self-regulating circuit, for instance by providing a saturable reactor or a transductor in one part of the excitation circuit, the reactor or transductor being itself controlled by the direct-current output of a voltage-sensitive device, which may include a zener diode to produce a reference voltage, connected across the output terminals of the alternator so as to detect and correct deviations of the output voltage from its nominal value.

What I claim as my invention and desire to secure by Letters Patent is:

1. A brushless alternator provided with a rotary frequency changer exciter, said exciter including a single rotary secondary winding connected through a rotary field rectifier to the rotary field winding of the alternator and further including a single stator primary winding fed from the output of the alternator, said exciter primary winding being fed via a substantially non-resistive constant impedance with a component of excitation current dependent on the output voltage of the alternator, said exciter primary winding being also fed with a component of excitation current dependent on the load current of the alternator and is obtained therefrom by a current transformer.

2. A brushless alternator as claimed in claim 1 in which the constant impedance is substantially inductive.

3. A brushless alternator as claimed in claim 2 in which the constant impedance comprises a linear reactor having an air gap in its magnetic circuit, said linear reactor being connected to the exciter primary winding in parallel with the current transformer secondary winding.

4. A brushless alternator as claimed in claim 3 in which a compensating capacitor is connected in parallel across said exciter primary winding, the capacitance of the capacitor being approximately matched with the reactance of the linear reactor at the normal output frequency of the alternator.

5. A brushless alternator as claimed in claim 2 in which the constant impedance comprises a voltage transformer including a primary winding connected across the output terminals of the alternator and further including a secondary winding connected in series with the secondary of the current transformer to said exciter primary winding.

6. A brushless alternator as claimed in claim 2 wherein said constant impedance comprises a linear auto-transformer serving as said current transformer, said auto-transformer including an air gap in its core and further including a winding connected in series with said exciter primary winding across the output terminals of the alternator, and a tapped portion of said auto-transformer winding being connected in series with the stator winding of the alternator to carry the load current.

7. A brushless alternator as claimed in claim 6 wherein the brushless alternator is single-phase and said exciter is wound in three-phase, and in which the said primary winding of the exciter comprises a star connection including two winding legs interconnected at their outer ends, said exciter primary winding being fed via said outer interconnected ends and at the outer end of the third leg of the winding.

8. A brushless alternator as claimed in claim 1 in which the constant impedance is substantially capacitative.

9. A brushless alternator as claimed in claim 8 in which the constant impedance comprises a capacitor having an impedance approximately matched with the reactance of the exciter primary winding at the normal output frequency of the brushless alternator.

References Cited

UNITED STATES PATENTS

| | | | |
|---|---|---|---|
| 2,742,603 | 4/1956 | Krebs | 322—25 |
| 2,992,380 | 7/1961 | Potter | 322—25 |
| 3,130,360 | 4/1964 | Churilow | 322—25 |

ORIS L. RADER, *Primary Examiner.*

H. HUBERFELD, *Assistant Examiner.*